United States Patent
Kirshenbaum et al.

(10) Patent No.: US 7,756,799 B2
(45) Date of Patent: Jul. 13, 2010

(54) FEATURE SELECTION BASED ON PARTIAL ORDERED SET OF CLASSIFIERS

(75) Inventors: Evan R. Kirshenbaum, Mountain View, CA (US); George H. Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 11/588,694

(22) Filed: Oct. 27, 2006

(65) Prior Publication Data

US 2008/0154820 A1 Jun. 26, 2008

(51) Int. Cl.
*G06F 15/18* (2006.01)
(52) U.S. Cl. ........................................ 706/20
(58) Field of Classification Search ............ 706/20, 706/47; 707/776, 600, 780
See application file for complete search history.

(56) References Cited

U.S. PATENT DOCUMENTS

| | | | |
|---|---|---|---|
| 5,850,518 A | | 12/1998 | Northrup |
| 6,081,620 A * | | 6/2000 | Anderholm ............ 382/194 |
| 6,105,015 A * | | 8/2000 | Nguyen et al. ............ 706/26 |
| 6,363,391 B1 | | 3/2002 | Rosensteel, Jr. |
| 6,513,025 B1 | | 1/2003 | Rosen |
| 6,745,189 B2 | | 6/2004 | Schreiber |
| 6,990,485 B2 | | 1/2006 | Forman et al. |
| 7,043,468 B2 | | 5/2006 | Forman et al. |
| 7,051,029 B1 | | 5/2006 | Fayyad |
| 2001/0021912 A1 | | 9/2001 | Demarcken |
| 2003/0115191 A1 | | 6/2003 | Copperman |
| 2003/0236659 A1 | | 12/2003 | Castellanos |
| 2004/0059697 A1 | | 3/2004 | Forman |
| 2004/0220840 A1* | | 11/2004 | Bonissone et al. ............ 705/4 |
| 2006/0101014 A1 | | 5/2006 | Forman et al. |
| 2006/0179016 A1 | | 8/2006 | Forman et al. |
| 2006/0179017 A1 | | 8/2006 | Forman et al. |
| 2006/0218132 A1 | | 9/2006 | Mukhin |
| 2006/0224538 A1 | | 10/2006 | Forman et al. |

OTHER PUBLICATIONS

Mitchell, Melanie, "An Introduction to Genetic Algorithms", MIT Press, 1998.*
Jang, T.-S. R., Sun, C. -T, Mizutani, E., "Neuro-Fuzzy and Soft Computing: A Computational Approach to Learning and Machine Intelligence" Prentice-Hall, 1997.*
George Forman, "An Extensive Empirical Study of Feature Selection Metrics for Text Classification", Journal of Machine Learning Research, 3 (2003), pp. 1289-1305.*
George Forman, "A pitfall and solution in multi-class feature selection for text classification", Proceedings 21st Int'l conf. Machine Learning (ICML 04) ACM Press, 2004 p. 38.*
Huan Liu et al., "Evolving Feature Selection", IEEE Intelligent Systems, vol. 20, (6) (2005), pp. 64-76.*
Kirshenbaum et al., U.S. Appl. No. 11/118,178, entitled "Providing Training Information for Training a Categorizer," filed Apr. 29, 2005, pp. 1-39, Figs. 1-3E.
Kirshenbaum et al., U.S. Appl. No. 11/118,786, entitled "Computing a Quantification Measure Associated with Cases in a Category," filed Apr. 29, 2005, pp. 1-35, Figs. 1-3D.
Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.
U.S. Appl. No. 11/588,608, Office Action dated Aug. 8, 2008, pp. 1-27 and attachments.
U.S. Appl. No. 11/588,608, Office Action dated Feb. 11, 2009, pp. 1-31 and attachments.

* cited by examiner

*Primary Examiner*—Donald Sparks
*Assistant Examiner*—Ola Olude Afolabi (57) ABSTRACT

A partial order among a set of classifiers is constructed, where the partial order indicates which classifiers can be input as features for other classifiers. Based on the partial order, a function based on an output of one classifier is selected as a feature for another classifier.

21 Claims, 4 Drawing Sheets

FEATURE SELECTION BASED ON PARTIAL ORDERED SET OF CLASSIFIERS

CROSS-REFERENCE TO RELATED APPLICATION

This is related to U.S. patent application Ser. No. 11/588,608 (U.S. Patent Publication No. 2008/0104101), entitled "Producing a Feature in Response to a Received Expression" filed Oct. 27, 2006.

BACKGROUND

A classifier (also referred to as a categorizer) is often used in data mining applications to make a decision about cases. The decision is typically either a "yes" or "no" decision about whether a case has a particular property, or a decision regarding which of plural classes (or categories) a case belongs to. Classifiers that are able to make decisions with respect to multiple classes are referred to as multiclass classifiers. Classifiers that make decisions regarding whether cases belong to a single class are referred to as binary classifiers Classifiers make decisions by considering features associated with cases. These features may be Boolean values (whether the case has or does not have some property), numeric values (e.g., cost of a product or number of times a word occurs in a document), or some other type of feature. In one technique of feature identification, textual data in cases is decomposed into a "bag of words," and each word seen in any string associated with a case becomes a feature, reflecting either the word's presence (Boolean) or its prevalence (numeric).

In general, especially when dealing with textual data, there can be a very large number of features available. Feature selection is thus conventionally used to narrow the set of features used to build (train) the classifier. Feature selection algorithms typically look at how well individual candidate features (or groups of candidate features) perform in classifying a training set of cases that have been labeled as to what the answer should be.

A conventional technique of building a multiclass classifier is to train multiple binary classifiers on training sets for each of the classes. The multiple individually trained binary classifiers are then combined to form the multiclass classifier. However, conventional techniques of building multiclass classifiers usually ignore many sources of information (possible features) that may be helpful to build more accurate classifiers.

BRIEF DESCRIPTION OF THE DRAWINGS

Some embodiments of the invention are described with respect to the following figures.

DETAILED DESCRIPTION

In accordance with some embodiments of the invention, a feature selector for selecting features for building classifiers is able to select the output of a first classifier (or outputs of multiple first classifiers) as a feature(s) for building a second classifier (or multiple second classifiers). A "feature" refers to a predictive indicator to predict whether any given case has a particular property or belongs to one or more classes. A "case" refers to a data item that represents a thing, event, or some other item. Each case is associated with information (e.g., product description, summary of a problem, time of event, and so forth). By using outputs of classifiers for building other classifiers, more accurate classifiers can be built than if such features were not considered.

The outputs of particular classifiers that can be used as input features for other classifiers include class decisions and other values produced by the particular classifiers. The values can be binary values (e.g., a value indicating whether a case belongs or does not belong to another class), numeric values (e.g., a probability that a case is a member of a class, a confidence score that the particular classifier's decision about a case is correct, or some other score produced in the course of the particular classifier's execution).

In addition to directly using outputs of particular classifiers as feature for other classifiers, expressions containing classifier outputs can also be used as features for other classifiers. An expression can be a Boolean expression or some other form of expression. Thus, generally, a function based on the output of a classifier can be used as a feature for another classifier, where the function based on the output of the classifier can include the output itself or an expression containing the output.

Usually, there is one classifier per class. However, in some scenarios, there may be multiple classifiers per class. An output (or a function based on the output) of a particular classifier for a given class can be used as a feature for another classifier for the given class.

In one scenario in which some embodiments of the invention are applicable, a case can take on multiple labels (corresponding to classes). The multi-label classification scenario is contrasted with 1-of-N classification tasks, in which exactly one label is selected for each case. However, it is noted that some embodiments of the invention are also applicable to 1-of-N classification tasks.

In the ensuing discussion, reference is made to using the output of a classifier as a feature for another classifier—note that the same techniques can be applied in the context of using any function based on the output of a classifier as a feature for another classifier. Also, the ensuing discussion assumes one classifier per class—however, the same techniques can be applied in scenarios where there are multiple classifiers per class.

Building a classifier refers to either initially training a classifier or retraining (modifying) a classifier. The term "classifier" refers to either a binary classifier or a multiclass classifier. A binary classifier is a classifier that is used to classify cases with respect to a particular class, whereas a multiclass classifier is used to classify cases with respect to multiple classes. The terms "class" and "category" are used interchangeably herein.

Since functions based on outputs of classifiers can be used as features for other classifiers (or stated more simply, classifiers can be used as features for other classifiers), the feature selector according to some embodiments provides a partial order (which is a temporal order in some embodiments) of the classifiers to define which classifiers can be used as features for other classifiers, and also which classifiers cannot be used as features for other classifiers. For example, if classifier X is used to produce a feature for classifier Y, then classifier X has be run before classifier Y; moreover, classifier Y's output cannot be used as a feature for classifier X. The term "partial order" is used since the order defined for the classifiers (for purposes of feature selection) usually does not fully specify the temporal relationship between all possible classifiers. However, "partial order" is intended to cover a complete (or "total") order as well. The feature selector can use one of several techniques (described below) for determining a partial order of classifiers (or classes) such that the feature selector can determine outputs of which classifiers can be used as features for other classifiers.

Figure 1:
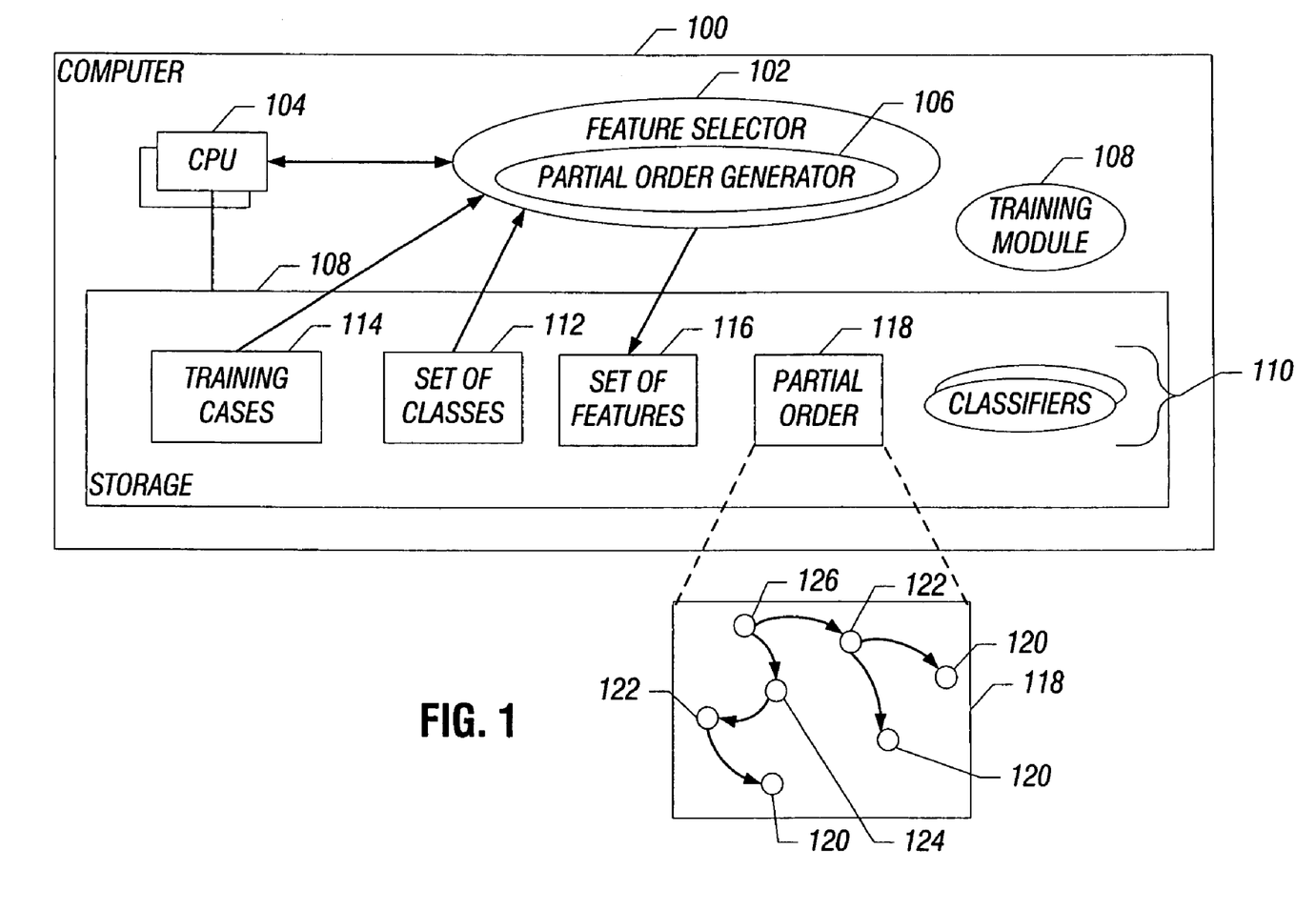
FIG. 1 is a block diagram of an example arrangement that includes a computer having a feature selector, according to some embodiments.

FIG. 1 illustrates a computer 100 on which a feature selector 102 according to some embodiments is executable on one or plural central processing units (CPUs 104). The computer 100 can be a single-node computer, or the computer 100 can have a distributed architecture having multiple nodes interconnected by a link or network. The feature selector 102 has a partial order generator 106 for generating partial orders of classifiers to enable classifiers to use outputs of other classifiers as features. Although depicted as being part of the feature selector 102, it is noted that the partial order generator 106 can be a separate module from the feature selector 102. Another module in the computer 100 is a training module 108 for building classifiers 110. The feature selector 102, partial order generator 106, and training module 108 are software modules in some embodiments. In other implementations, the various modules depicted in FIG. 1 can be executed on different computers.

Each of the classifiers 110 can be a binary classifier. A collection of the binary classifiers 110 can make up a multi-class classifier for a set of classes 112. In some implementations, the set of classes 112 can form a hierarchy, such as a tree or directed acyclic graph (DAG) of classes. In other implementations, the set of classes 112 do not have to be in a hierarchy. In FIG. 1, the classifiers 110 and set of classes 112 are depicted as being stored in a storage 108, which can be volatile storage (e.g., system memory such as dynamic random access memory or static random access memory) or persistent storage (e.g., disk-based magnetic or optical storage).

The storage 108 also contains training cases 114, with some of the training cases being labeled training cases. A labeled training case is a case that has been labeled as being a positive case or a negative case for a particular class. A positive case refers to a case that is to be treated as positive with respect to the particular class (in other words, a case that an ideal classifier would decide was an instance of the class), whereas a negative case is to be treated as negative with respect to a particular class (in other words, a case that an ideal classifier would decide was not an instance of the class). The feature selector 102 is able to extract features based on information associated with the training cases 114, which features are stored as a set of features 116 in the storage 108. The set of features 116 based on information associated with the training cases 114 can be used to build classifiers. An algorithm is used to train the classifiers according to some model, including naïve Bayes, decision tree, support vector machine (SVM), and so forth.

The partial order generator 106 is able to build a partial order data structure 118 (also depicted as being stored in storage 108) that refers to some order of classifiers (or classes), which order can be used to determine which classifiers can be used as features for other classifiers. As depicted in FIG. 1, the partial order data structure 118 can be in the form of a graph having nodes 120, 122, 124, 126 (representing corresponding classes) and arcs connecting the nodes. An arc from a first node (representing a first class) to a second node (representing a second class) indicates that the first class dominates the second class (in other words, the classifier associated with the first class cannot be used as a feature for the classifier associated with the second class; however, this means that the classifier associated with the second class can be used as a feature for the classifier associated with the first class). The graph representing the partial order has three leaf nodes 120, which represent leaf classes that do not dominate any other class.

Figure 2:
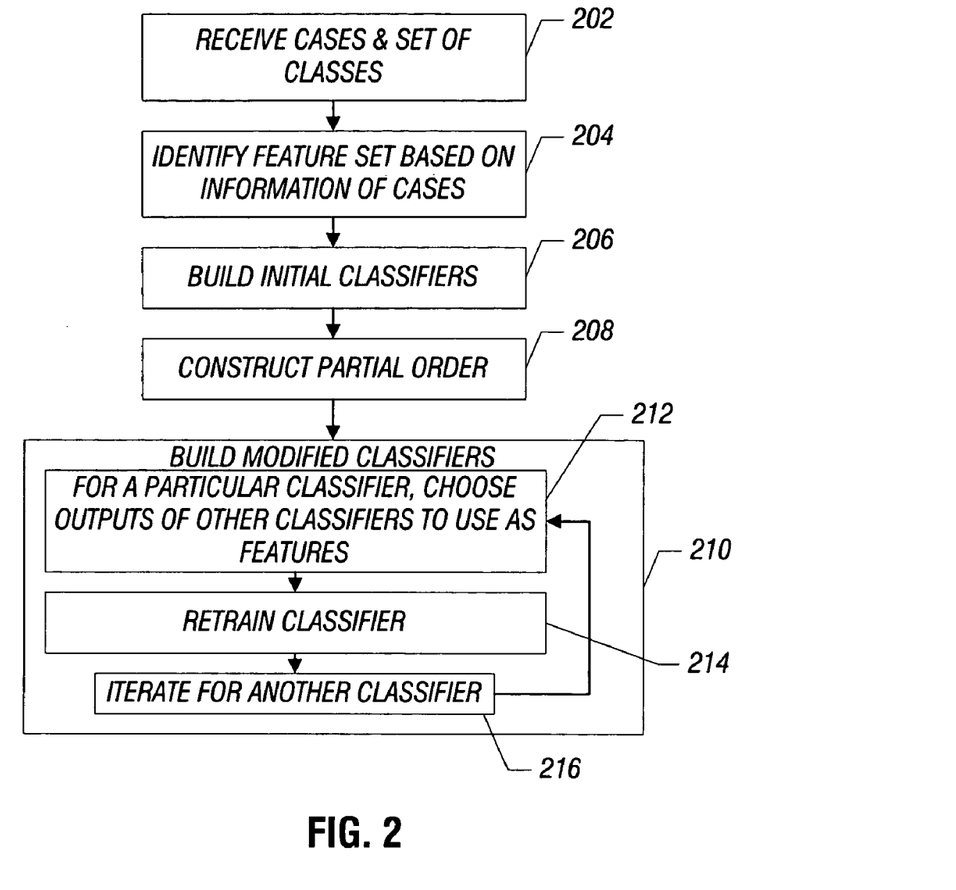
FIG. 2 is a flow diagram of a process performed by the feature selector, according to an embodiment.

FIG. 2 illustrates a process performed in the computer 100, in accordance with some embodiments. Initially, cases (such as the training cases 114) and the set of classes 112 are received (at 202) by the feature selector 102. The training cases 114 can be labeled for each class in the set of classes 112. Note, however, that not all the training cases have to be labeled for each class. Each case has associated with it some data that can be used for classification, and from this data, various features are identified (at 204) by the feature selector. Note that often the number of possible features can be quite large, so that some form of feature selection can be used. Many different types of algorithms can be used for selecting a set of features from among the collection of candidate features, including a bi-normal separation technique, an information gain technique, or some other feature selection technique.

At this point, only the identified features are used to build (at 206) initial classifiers; no classifier output is given as an input to any initial classifier. Building initial classifiers refers to training the initial classifiers by the training module 108. Once the initial classifiers are built, a partial order of classifiers is developed (at 208) by the partial order generator 106. In addition to using data associated with cases themselves in training classifiers, the developed partial order of classifiers allows classifiers to use decisions and/or values produced by other classifiers as features. The partial order developed by the partial order generator 106 prevents every classifier from using the output of every other classifier as features, as that would imply that every classifier would have to be run before every other classifier. The partial order provides a well-defined ordering that specifies which classifier has to be run before another classifier. The partial order is stored in the partial order data structure 118 (FIG. 1).

As discussed further below, building the partial order is based on desirability measures associated with using certain classifiers as features for other classifiers. The desirability measures are computed for each possible combination of classes. For example, if there are three classes A, B, C, then there would be six possible combinations: (A, B), which means use the classifier for class B as a feature for the classifier for class A; (A, C); (B, A); (B, C); (C, A); and (C, B). A measure of the desirability for each of the combinations is computed, where the desirability measure can include a score representing the performance of the particular combination. A desirability measure for (A, B) is a measure computed for classifier A with respect to class B. More generally, a desirability measure for (A, S) is a measure computed for classifier A with respect to a set S of classes, representing a desirability of using classifiers for all of the classes in S as inputs as features for the classifier for class A. (A, B) can be thought of as the case in which set S contains only class B (that is, as (A, {B})).

To compute such desirability measures, actual building of classifiers using the combinations has to be performed in some embodiments. The computing involves using a current classifier (e.g., for class B) to obtain a feature value for a training case for class A. Obtaining the feature value includes obtaining one of: a decision reached by the current classifier, a score computed by the current classifier, a confidence measure for a decision reached by the current classifier, and a probability measure reached by the current classifier.

Once the partial order is created, additional features that include outputs of other classifiers can be selected based on the partial order. Modified classifiers are then built (at 210) using outputs of other classifiers according to the partial order. In building a modified classifier (a particular classifier), the particular classifier (associated with a particular class) is allowed to choose (at 212) as features (feature selection) outputs produced by other classifiers corresponding to other classes that the particular class dominates. If class A dominates class B, then the output of the classifier for class A is not permitted to be used as a feature for the classifier for class B. According to the selection performed at 212, the classifier is retrained (at 214) by the training module 108 (FIG. 1) using other classifiers as features. In some embodiments, retraining of classifiers (using other classifiers as features) is performed in a "bottom-up" approach, starting with the leaf classes (those that do not dominate any other class, e.g., classes associated with leaf nodes 120 in the partial order data structure 118 of FIG. 1) and moving upwardly in the hierarchy. Classifiers associated with leaf classes are referred to as leaf classifiers.

Note that in building the modified classifiers (210), a different model or training algorithm can be used than that used for constructing the partial order (208). As noted above, when building the partial order, classifiers are actually built to enable the computation of desirability measures. According to some embodiments, to construct the partial order, a model that is quick to train, such as naïve Bayes, can be used. When building the actual modified classifiers, a more accurate model, such as SVM, can be used.

In building the modified classifiers (at 210), leaf classifiers (which have been trained using features based directly on information associated with cases in their training sets) add features to all of the cases in the training sets for all of the classes that dominate the class of the leaf classifier in the partial order. For example, if the classifier for class A is a leaf classifier, and class B dominates class A, then the trained leaf classifier for class A is used to modify the training cases for class B, wherein examples of the modification include adding information to the class B training cases indicating some output of the leaf classifier (e.g., the leaf classifier predicted a "yes" or a "no" with respect to some property of a case, a score produced by the leaf classifier during execution of the leaf classifier, etc.). The training cases for other classes that dominate A would also similarly be modified using the output of the leaf classifier for class A. In some embodiments, rather than recording the decisions in a data store or in the memory of the computer 100, the information may be recomputed as needed by re-invoking the classifier for class A.

The process (210) is iterated (at 216) to choose the next classifier that does not dominate another class that has not yet been processed. In proceeding up the hierarchy, the modified classifiers are used to add features to training cases of classes that dominate the modified classifiers. Thus, in the context of the example partial order represented with the data structure 118 of FIG. 1, the leaf classifiers (associated with nodes 120) are used to add features to the training cases of classes represented by intermediate nodes 122. Next, the modified classifiers associated with intermediate nodes 122 are used to add features to the training cases for corresponding classes associated with higher-level classes (represented by nodes 124, 126, for example). The process continues up the hierarchy of the partial order (although just a few nodes are depicted in the example partial order data structure 118 of FIG. 1, it is noted that the partial order can include many other nodes). In this manner, the outputs of classifiers are used as features for other classifiers according to the partial order.

In an alternative embodiment, once the partial order has been constructed at 208, the following procedure is followed. The bottom-up approach is also used, starting with leaf classifiers. However, in the alternative procedure, the partial order is modified by removing from the partial order graph all edges extending from a particular class that dominates the leaf classes. Feature selection is then performed as in 212 to select classifiers to use as features for the particular class. Following the feature selection, one or more edges are added from the node corresponding to the particular class to the nodes of other classes whose classifiers were selected as features for the particular class. This may add back some or all of the edges just removed, and may add other edges. Alternatively, instead of first removing all edges from the node corresponding to the particular class, edges from the particular class to other classes not selected as features can be removed, while edges can be added to the graph from the particular class to other class(es) that were selected as features but which edges were not originally part of the graph.

The same procedure is repeated for other classes in the partial order graph. The result of the alternative embodiment is a new partial order that is based on feature selection.

Once the new partial order is constructed, the following procedure can be iteratively performed to obtain even better classifiers. A class in the partial order is selected, which may be based on the importance of the class, on the performance of the current (most recently trained) classifier for the class, by the class's position in the partial order, or some combination of the above and/or other factors.

Feature selection is then performed for the selected class. However, in this case, instead of selecting just from non-classifier features and features based on classifiers dominated by the selected class, the classifier for the selected class can also select from features based on any classifier that does not dominate the selected class. In other words, if there is a class C in the new partial order that class A does not dominate, and that does not dominate class A, then class A is allowed to consider class C as well. Based on such selection, the partial order graph is modified. If the set of features selected using this technique is different from the prior set of features, then a new classifier is trained using the new set of features. Optionally, the performance measures of all classifiers that depend on the selected class are recursively recomputed.

The above procedure is repeated for other classes until some computation budget is exceeded or until it is decided that every classifier has a performance measure that is "good enough," such as the performance measure being greater than some threshold or the same set of features are repeatedly selected.

Figure 3:
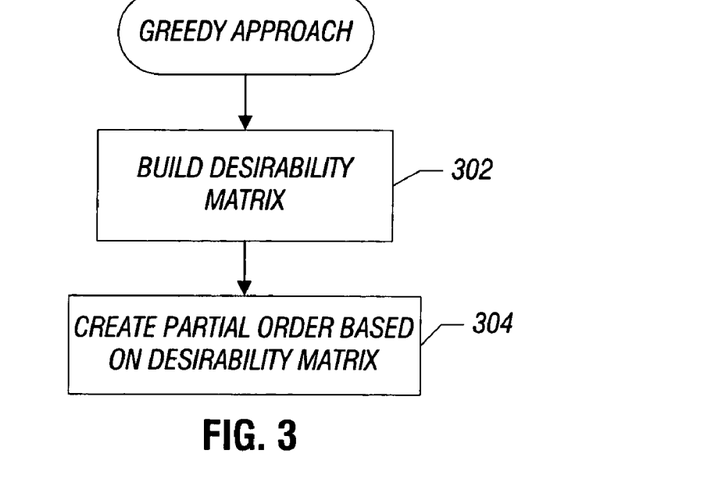
FIG. 3 is a flow diagram of a greedy approach of building a partial order of classifiers for use in selecting classifiers as features for other classifiers, according to an embodiment.

FIG. 3 shows a first approach (an iterative or forward selection approach) for developing the partial order (208 in FIG. 2). A desirability matrix is built (at 302), where the desirability matrix in one embodiment can be in the form of a table in which the rows are the classes for which classifiers are to be used as input features, and the columns are the classes to be used as input features. More generally, a first dimension of the desirability matrix indicates classes for which classifiers are to be considered for use as input features, and a second dimension of the desirability matrix indicates classes to be considered for use as input features. Each dimension can represent either rows or columns. For example, if the first dimension represents rows, then the second dimension represents columns; and vice versa. Each value or entry (A, B) in the table is a measure of the desirability of using some output of classifier B as a feature for classifier A. The term "classifier X" is shorthand for "the classifier for class X." In other implementations, other data structures (e.g., graphs) can be used to represent the desirability matrix.

The measure of desirability for each value (A, B) in the table can be based on metrics used to judge performance of a classifier. Such metrics include, but are not limited to, any one or more of the following: chi-squared value (based on chi-squared distribution, which is a probability distribution function used in statistical significance tests), an accuracy measure (the likelihood that a particular case will be correctly identified to be or not to be in a class), an error rate (percentage of a classifier's predictions that are incorrect on a classification test set), a true positive rate (the likelihood that a case in a class will be identified by the classifier to be in the class), a false negative rate (the likelihood that an item in a class will be identified by the classifier to be not in the class), a true negative rate (the likelihood that a case that is not in a class will be identified by the classifier to be not in the class), a false positive rate (the likelihood that a case that is not in a class will be identified by the classifier to be in the class), a recall measure (same as true positive rate), an area under an ROC (receiver operating characteristic) curve (area under a curve that is a plot of true positive rate versus false positive rate for different threshold values for a classifier), an f-measure (a parameterized combination of precision and recall), a precision measure (the likelihood that an item identified to be in a category actually is in the category), a mean absolute rate (the absolute value of a classifier's prediction minus the ground-truth numeric target value averaged over a regression test set), a mean squared error (the squared value of a classifier's prediction minus the true numeric target value averaged over a regression test set), a mean relative error (the value of a classifier's prediction minus the ground-truth numeric target value, divided by the ground-truth target value, averaged over a regression test), and a correlation value (a value that indicates the strength and direction of a linear relationship between two random variables, or a value that refers to the departure of two variables form independence), a bi-normal separation measure, an information gain measure, or some combination of the above. Also, the metric can include an expected cost for misclassification. The metrics can be used directly as the desirability value, or the metrics can be obtained for an entire column and then the ordinal rank of the value is used as the desirability.

Several techniques can be used for deriving the desirability values. With a first technique, referred to as technique (1), for each pair of classes A and B, a new classifier A is trained (built) for class A, allowing (but not necessarily requiring) classifier A to use the output(s) of classifier B as an input feature(s). The new classifier A is then applied to training cases for classifier A, and based on the correct and incorrect decisions made on the training cases, a metric, such as accuracy (likelihood that a particular use will be correctly identified by classifier A) or any of other metrics listed above is computed. This metric can then be used as (or used to produce) the desirability value for entry (A, B) in the desirability matrix. The training cases used to obtain the metric may be the same as the training cases used to train the classifier or they may be cases that were excluded from those used to train the classifier. In some embodiments, cross-validation may be used to obtain a metric by averaging over the metrics obtained by training several classifiers for class A, each excluding (and computing the metric based on) different subsets of the training cases.

Alternatively, with a second technique, referred to as technique (2), the desirability value for an entry in the desirability matrix is the difference between the metric obtained using the new classifier A and the same metric obtained when the initial classifier A (classifier A built before the output of classifier B is used as a feature for modifying classifier A) was applied to the training cases of classifier A. In other words, the desirability value in this case is a measure of the improvement obtained by adding the output(s) of classifier B as a feature for classifier A, e.g., the improvement in classifier accuracy given B, expressed as either an absolute value or a relative percentage. Note that with both techniques (1) and (2), for n classes, $n^2$ classifiers will have to be built. However, as noted above, these $n^2$ classifiers can be built using a model that is relatively quick to train and/or admits incrementally adding features, such as naïve Bayes, to make the calculation of desirability values for the desirability matrix more efficient. In some embodiments, fewer than all of the $n^2$ values in the desirability matrix may be computed.

As yet another alternative, referred to as technique (3), a simpler technique can be used for computing the desirability values in the desirability matrix. In technique (3), the outputs of each class' classifier are used by themselves to induce a classifier over each of the other classes. In other words, each classifier is evaluated as a classifier for another class. For example, classifier B is applied to training cases that are known to be positives for class A. A metric is computed regarding the performance of classifier B when applied to these training cases. As an alternative, classifier B is applied to training cases that are known to be negatives for class A, with a metric computed regarding the performance of classifier B when applied to these training cases that are known to be negatives for class A. The classifier applied to training cases of other classes need not have the same sort of model as the full classifiers which are being built. In one example, this classifier can take the form of simply "if classifier B would have called a particular case a B, call the particular case an A."

In an alternative example, the model can be "given the score classifier B gets when trying to figure out whether the particular case is a B, find an optimal threshold for deciding whether the particular case is an A." This optimal threshold is the threshold for score values computed by classifier B when applied to training cases for class A to enable classifier B to decide whether cases does or does not belong to class A. When applied to a case, if the score computed by classifier B is greater than the threshold, then classifier B would classify the case as belonging to A; on the other hand, if the score computed by classifier B is less than the threshold, then classifier B would classify the case as not belonging to A. A metric can then be derived to determine how well classifier B does with respect to classifying cases in class A given this threshold.

A hybrid embodiment can also be used, by first using technique (3) above to find desirability values for the desirability matrix. From the desirability values calculated using technique (3), a subset of the most desirable pairs is extracted, and then technique (1) or (2) can be run so that the desirability matrix is restricted to have values for the identified pairs.

Once the desirability matrix has been built (302), a partial order can be created (at 304). In one embodiment, the partial order can be represented as a topological graph (e.g., 118 in FIG. 1) having nodes representing classes (such a graph is referred to as a "partial order graph"). With a first partial order building technique, arcs (from one node to another node) are added to the graph iteratively, where the arc represents one class dominating another class. The arcs added to the topological graph can be referred to as dominance arcs for indicating that wherever an arc is present in the graph from a first node to a second node, that indicates that the class associated with the first node dominates the class associated with the second node. For example, an arc from node A (corresponding to class A) to node B (corresponding to class B) indicates that class A dominates class B. With this technique, the desirability matrix is read to find the desirability value that is most desirable (largest or smallest depending on the metric used), and the corresponding arc (from node A to node B, assuming that the most desirable value is found at entry (A, B)) for this desirability value is added to the graph, provided the following condition is met: B does not dominate already A. If this condition is not met, adding the arc from A to B would cause there to be a cycle in the graph and the graph would therefore cease to reflect a partial order. Note that dominance is both reflexive (every class dominates itself) and transitive (if A dominates C and C dominates B, then A dominates B), so if B dominates A, then there is some path from node B, possibly through other nodes, terminating in node A. Adding an arc from node A to node B would mean that there was a non-trivial path from node B back to itself.

Alternatively, the arc from A to B can be added only if the following condition is met: neither A nor B dominates the other. This alternative test fails if either (1) B dominates A; or (2) A dominates B (directly or indirectly). Condition (2) addresses the issue that if A already dominates B indirectly (that is, by transitivity), then there is no need to add the arc directly from A to B. This allows the number of arcs in the graph to be reduced since direct arcs are not needed if an indirect relationship already exists. The indirect relationships can be tracked in a separate data structure.

The process above is repeated for the next most desirable value in the desirability matrix, with a corresponding arc added to the graph for this next value. This process repeats until no further arcs can be "profitably" added. An arc is considered to not be profitable if the benefit of such an arc is outweighed by a cost associated with adding such arc. In one example, a threshold can be defined such that any desirability value below this threshold is considered not profitable.

Another stopping rule (rule to stop adding any further arcs to the partial order graph) is that every class has some minimum number of arcs from the node corresponding to the class, and that no further arcs can be added (due to the conditions discussed above). Yet another stopping rule is that adding arcs can be stopped if a predefined number of iterations have been performed or some predefined amount of processing time has passed.

Alternatively, using a second partial order building technique, after each (or each k, where k is $\geq 1$) dominance arc(s) is (are) added from class A to other class(es) in the partial order, a new classifier is trained for class A possibly using the output(s) of other classifier(s) as a feature. The desirability matrix is then updated after building the new classifier for class A. Updating the desirability matrix involves recomputing the desirability scores (A, X) for all classes X and, if either technique (2) above is used for computing the desirability matrix or the "neither A nor B dominates the other" test (discussed above) is used for adding arcs to the graph, the desirability values of (Y, A) for all classes Y are also recomputed. Note that recomputation of desirability values for pairs ruled out for selection by the partial order does not have to be performed.

Although the desirability matrix discussed above uses columns that are classes, an alternative embodiment can define columns of the desirability matrix as being corresponding subsets of classes, where each subset includes one or more classes. In one example, each subset of classes can be a pair of classes (or pairs and singletons, where a singleton set is a set of one class). Alternatively, each subset of classes can be full combinatoric sets (sets of all possible combinations of classes or all possible combinations up to some predefined size, assuming that the number of classes is relatively small and sufficient computation power exists).

In the embodiment where a column represents a subset of classes, such as a subset {B, C, D}, when a desirability value (A, {B,C,D}) is chosen to add to a partial order graph, the partial order graph is modified to add arcs from A directly to all of B, C, and D. Also, the selection criterion is modified to specify that the arcs from A to B, C, D are added to the partial order graph if A is not dominated by any of B, C, and D (and in the alternative embodiment, that A further does not dominate all of B, C, and D).

One particular scenario in which subsets of classes may be used in the desirability matrix arises when the overall set 112 (FIG. 1) of classes is organized as a hierarchy (tree or DAG). In such a scenario, a class and all of its children (or descendents), or alternatively, the children (or descendents) of a class, would form natural subsets. Also, if some or all of the non-leaf nodes of the graph were to be defined as being, for example, the union of their children's classifications, the rows of the desirability matrix can be the classes for which classifiers are to be trained (some classes may be omitted from rows in the desirability matrix since their classification is based on the classifications of other classes) and the columns can be all of the classes. In this scenario, the partial order is initialized to have each such defined class dominate the classes it uses in its definition. For example, if class X is defined based on the union of classes X1, X2, or X3 (children of X) (e.g., it's an animal if it's a dog, cat, or mouse), then a row for X is omitted from the desirability matrix, but a column is added to the table for X even though there is no row for X. Moreover, the partial order starts with X dominating X1, X2, and X3, so that whenever (A, X) is added, none of X1, X2, or X3 can subsequently dominate A.

In each of the various techniques discussed above, classes may be associated with weights, which can reflect either a relative importance of classifying cases in that class (as opposed to other classes) or a relatively larger need for improvement based on the performance of current classifiers for one class over another. As an example of the first case, when classifying on-line shopping sessions, a set of classes may include both whether a customer is male or female and whether a customer will make a purchase or not. In such a case, it is likely more important to the store to do well on the second question than on the first, and so it is preferential to choose to add arcs which are more likely to help in making that classification. As an example of the second case, if the desirability of (A, B) is more than the desirability of (B, A), but A's current classifier already gets 95% accuracy, while B's classifier only gets 30% accuracy, weights due to the difference between the current accuracy and a target accuracy may mean that it is preferably to add (B, A), even though the desirability matrix values are smaller. When using weights to select a pair of classes to add to the partial order (as an arc), the weighting on the classes may be combined with the values in the desirability matrix to identify the most desirable arc to add. Such a combination may be as simple as multiplying the value in the desirability matrix by the weight associated with its row class or it may be a more complex calculation.

Figure 4:
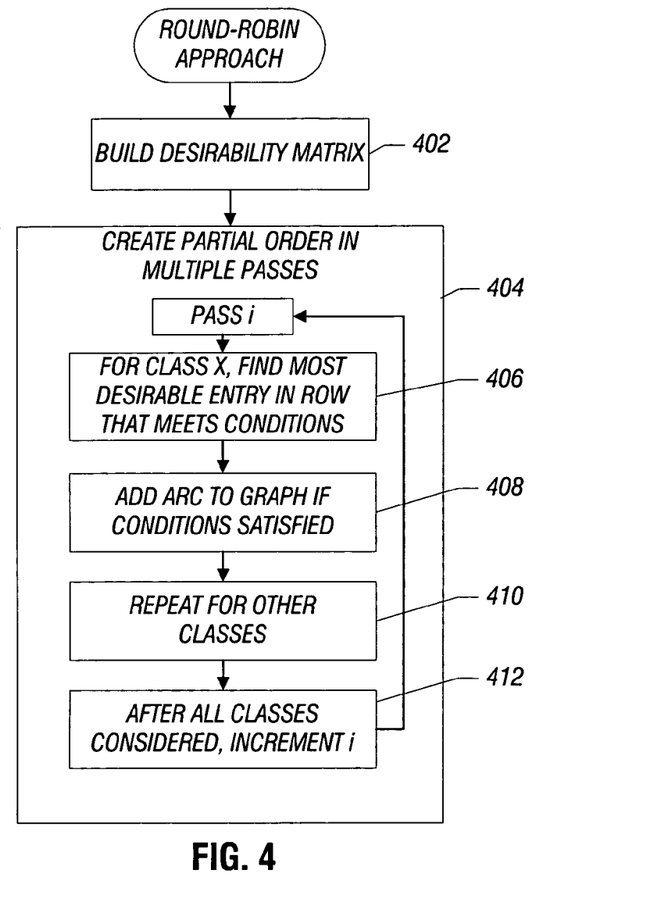
FIG. 4 is a flow diagram of a round-robin approach of building a partial order of classifiers for use in selecting classifiers as features for other classifiers, according to another embodiment.

Alternatively, cost matrices can be associated with corresponding classes, where each cost matrix includes costs associated with the classes, such as a cost for a false positive and a possibly different cost for a false negative. The cost matrices are used to identify the most desirable arc to add to the partial order graph The above discussion in connection with FIG. 3 describes a first approach ("greedy approach") for producing the partial order. FIG. 4 illustrates another approach (referred to as a "round robin approach") for building the partial order. As depicted in FIG. 4, the desirability matrix is built (at 402) using the same techniques as those described for building the desirability matrix in step 302 in FIG. 3. Then, the partial order is created (at 404) in multiple passes. In pass i, where i begins with 1, each of the classes is considered in sequence. The order the classes are considered can be a predefined order, an arbitrary order, a random order, or a back-and-forth order. Thus, for class A, all the entries in the row for class A are considered to find (at 406) the entry with the most desirable value (highest or lowest depending on the metric used) that meets predetermined conditions (as discussed above in connection with FIG. 3). The arc corresponding to this entry is then added to the graph (at 408). Steps 406 and 408 are repeated (at 410) for each of the other classes not already considered in pass i. Once all classes have been considered in pass i, the variable i is incremented (at 412) and the next pass is performed. Step 404 is repeated in multiple passes until a predefined number of passes have been performed, until no further arcs can profitably be added, until a predefined amount of time has passed, or until some other termination condition is met.

The round robin approach of FIG. 4 has the benefit that all classes are considered when adding arcs to the graph. In the greedy approach of FIG. 3, it may be possible for some classes to be starved when selecting arcs to add to the graph, since such classes may be associated with low desirability values and thus would not be considered until close to the end of the greedy approach, at which point it may be difficult or impossible to add arcs to the partial order graph due to presence of cycles.

With the approach of FIG. 4, after each arc (or a k number of arcs), has (have) been added to the graph or after each pass, the desirability matrix can be recomputed before further arcs are added (similar to the technique discussed for the greedy approach of FIG. 3). Also, if the notion of weighting is provided to indicate the relative importance of classes, the round robin approach can be modified to allow the more important classes more turns in each pass. For example, if class F is an important class, then class F may be given two or more iterations within a single pass. If the relative importance is based on the performance of current classifiers for classes, this different number of turns may be recomputed after each pass or after classifiers are retrained.

Figure 5:
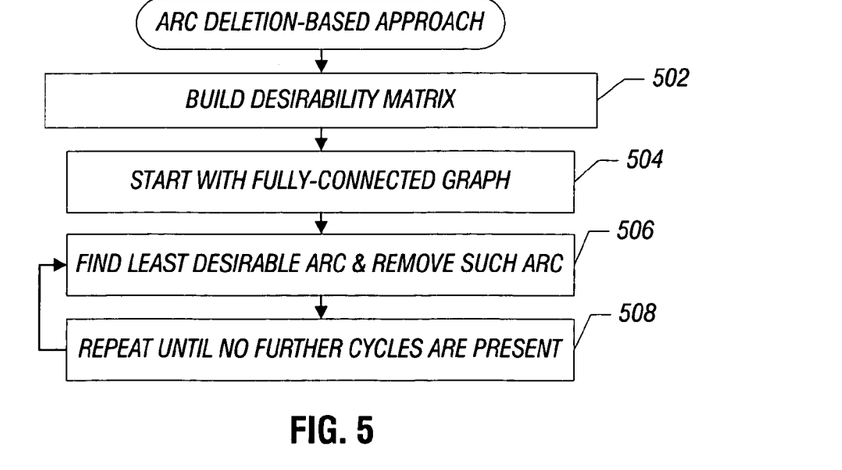
FIG. 5 is a flow diagram of an arc deletion-based approach of building a partial order of classifiers for use in selecting classifiers as features for other classifiers, according to a further embodiment.

FIG. 5 shows an arc-deletion-based approach to producing the partial order. Building of the desirability matrix (at 502) can use the same techniques as in step 302 in FIG. 3. However, the arc-deletion-based approach starts (at 504) with a fully-connected graph, in which all pairs of distinct nodes are connected to each other by arcs, with the arcs assigned respective desirability values from the desirability matrix. This fully-connected graph will contain cycles. The arc-deletion-based approach then finds (at 506) the least desirable arc (based on desirability value) that participates in a cycle and removes the arc from the graph. As with the other approaches, choosing the least desirable arc may involve the relative importance of the classes associated with the nodes the arc connects. Step 506 is repeated (at 508) until no more cycles are present in the graph, where the resulting acyclic graph defines the partial order.

Instead of iterating through the graph to find arcs with the lowest desirability values to remove arcs, other techniques can be employed to find arcs to remove in order to eliminate cycles in the graph while maximizing the desirability of the resulting acyclic graph.

Figure 6:
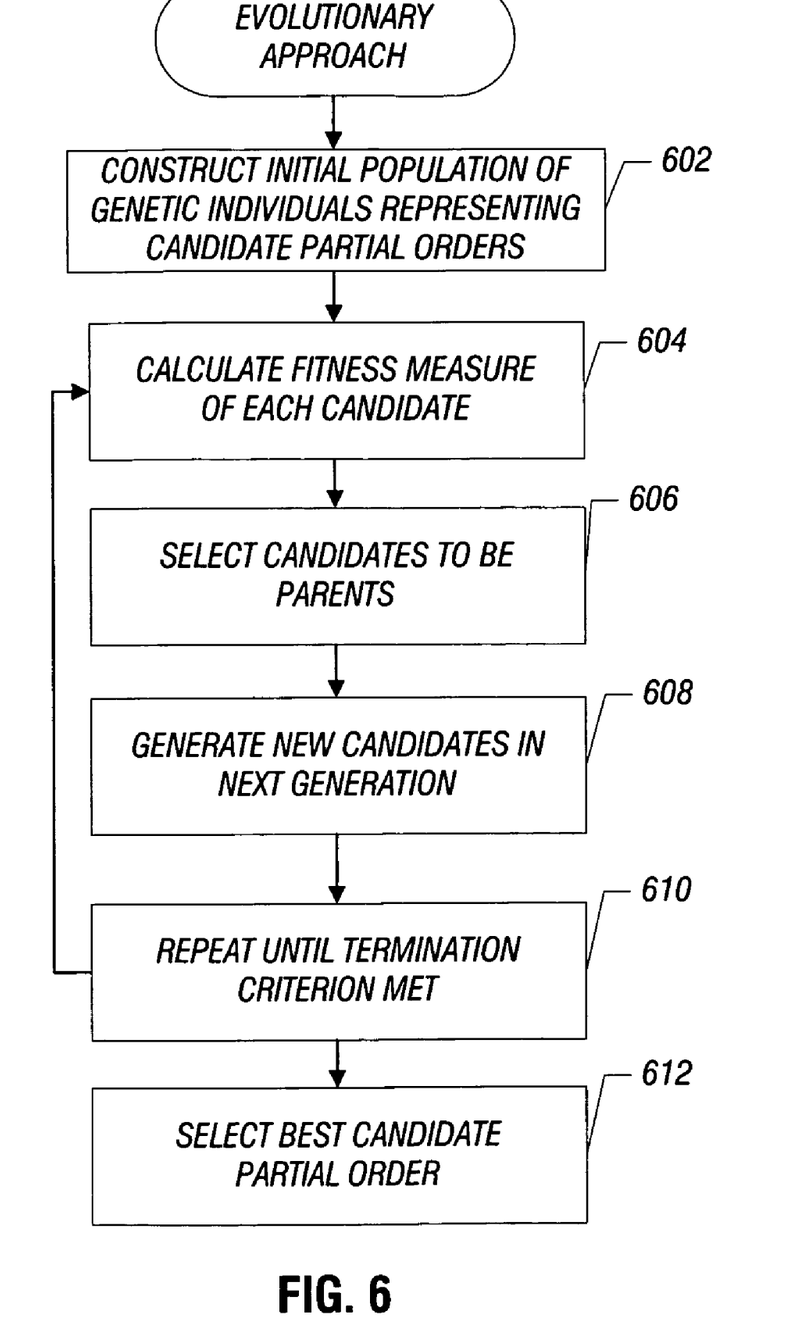
FIG. 6 is a flow diagram of an evolutionary approach of building a partial order of classifiers for use in selecting classifiers as features for other classifiers, according to a yet another embodiment.

Another approach that can be used for producing a partial order is an evolutionary approach, in which an evolutionary algorithm such as a genetic algorithm or genetic programming can be employed. A genome representation is defined for a partial order, where the genome representation may be in the form of a tree, DAG, permutation, list of dominant pairs, or some function that provides some score relative to one class dominating another class (with some relationship specified to ensure that there are no cycles). A specific instance of this genome representation is referred to as a genetic individual. As shown in FIG. 6, the evolutionary approach constructs (at 602) an initial population of genetic individuals representing corresponding candidate partial orders. The initial population may be random or may be influenced by a desirability matrix built using the desirability matrix discussed above.

Given a population of candidates, an overall fitness measure is calculated (at 604) for each candidate partial order. In computing the overall fitness measure for each candidate, each particular classifier can be trained for the corresponding particular class, selecting features from information associated with training cases for the class, and selecting as features classes that the particular class dominates in the candidate partial order. A measure can be obtained for each classifier, and the measures of the classifiers can be combined (possibly taking importance into account) into an overall fitness measure for the candidate partial order.

Since there are a large number of candidate partial orders, the training of classifiers for all possible candidate partial orders can be computationally expensive. An alternative approach to computing the fitness measures for candidate partial orders (which does not involve building classifiers for each of the candidate partial orders) is as follows. Given a desirability matrix, simply sum all the desirability values associated with dominance arcs (representing classes that dominate other classes) in the particular candidate desirability matrix. In other words, for each dominance arc (A, B) in the particular partial order, the corresponding desirability value is added to a sum. This summing of desirability values for dominance arcs present in a partial order graph is repeated for each of the other graphs. The sums represent corresponding fitness measures of the respective candidate partial orders. The sums are used as the fitness measures to indicate which candidate partial orders have better fit. Importance weighting can also alternatively be applied in computing the sum for each candidate partial order.

Once the fitness measures for each candidate partial order in the population is calculated, an evolutionary algorithm (e.g., a genetic algorithm or genetic programming) can be used to select (at 606) candidates to be parents for creating candidates of the next generation. These new candidates are created by combining and/or mutating the parents' genetic material.

The process is repeated until either a candidate is found whose fitness measure (either the fitness measure used for selecting parents or a different fitness measure) crosses some predefined threshold, a certain number of generations (or some amount of computation time) has passed since the last "best so far" candidate partial order has been found, an absolute number of generations or amount of time has passed, or some other criterion is met.

Next, the best candidate is selected (at 612), either from the final population of from some prior population or combination of populations. The fitness measure used for selecting the overall best candidate may be different from the fitness measure used to select parents. In particular, it may be desirable to use a cheaper (from a computational standpoint) parent selection measure to bias the selection of a number of "probably good" candidates in each generation, and then use the more expensive (from a computational standpoint) retraining approach to obtain good measures for each candidate partial order.

Using the evolutionary approach of FIG. 6, it may be desirable to have separate sets of training cases and validation cases in some implementations, where the training cases are used to train and bias the selection as parents, and the validation cases are used to select the winners. Use of separate training and validation cases reduces the likelihood of overfitting.

In an alternative embodiment, the actual features may not be the classifier outputs themselves, but rather expressions based on outputs of one or more classifiers. For instance, the outputs of classifiers A and B can be represented as predicted (A) and predicted(B), respectively. Rather than use predicted (A) and predicted(B) as features, expressions produced from predicted(A) and/or predicted(B) can be used instead. Other outputs of a classifier include, for example, confidence(A), which is a value indicating a confidence level of classifier A with respect to a particular case. Example expressions based on outputs of classifiers include "predicted(A) AND NOT predicted(B)," "confidence(A)>75%," or even expressions involving other data associated with cases, such as "predicted (A) AND in(description, 'foo') AND cost<$100."

In such embodiment, the expressions are received by the feature selector 102, which expressions can be (1) created by users for inclusion in queries, (2) provided in reports, or (3) otherwise derived from interaction between users and a system. Once the expressions are received by the feature selector 102, one of the above techniques would be performed to compute desirability values based on the expressions. Note that the expressions are added as columns in the desirability matrix. Also, a partial order is built based on the sets of classifiers specified in each expression. When selecting one of these expressions as a feature, the number of arcs added to the partial order graph is based on the classifier outputs specified in the expression. Thus, for example, given an expression "predicted(A) AND predicted(B)" or "confidence(A)>confidence(B)", if this expression is to be used as a feature for classifier C, then two arcs would be added to the partial order graph: an arc from class C to class A, and another arc from class C to class B. Note that no class in the expression would be allowed to dominate the class for which the expression is to be used as a feature.

Alternatively, rather than adding a column for each expression, a column can be added for each set of classes specified by an expression. This allows multiple expressions dependent on the same set of classes to be reflected by a single column. In one such embodiment, if a set S is identified as a column, the desirability values in that column are based on all identified received expressions whose values are computable using values produced by classifiers for some or all classes in S. (Note that in some embodiments this may include expressions whose values do not specify all of the classes in S.) For technique (3) above, the desirability value for such a column would be the most desirable of the values for each expression that depends on values produced by classifiers for all classes in S.

Thus, generally, either outputs of classifiers or expressions containing outputs of classifiers can be used as features for other classifiers. Stated broadly, a function based on the output of a classifier can be used as a feature for another classifier, where the function based on the output can be the output of the classifier or an expression involving the output of the classifier.

Given a set of expressions, subsets of them may form loops, which should not be allowed. The partial ordering techniques described above can be used to select the most useful of these expressions as inputs to various classifiers, but avoid less valuable expressions that create loops.

In some other embodiments, for some classes a user may define a list of rules (expressions as above, with an implication clause, e.g., "predicted(A) AND 'HP'→class B") to serve as the classifier for that class. In the preceding example rule, if a case is predicted to be in class A and contains the word "HP," then the rule would classify the case as being in class B. By defining dependencies on other classifiers, the list of rules enforces a partial order over the classes. In the techniques discussed above, instead of starting with a trivial partial order (in which no class dominates any other class), the list of rules can be used to specify an initial partial order.

In some cases, loops may be inadvertently produced in the list of rules for different classes. In one embodiment, sub-expressions in the list of rules may be treated as separate columns in the desirability matrix, and the least valuable sub-expressions that create loops would not be included in the final classifier. The sub-expressions that are most important will be included first, and less valuable sub-expression(s) that would cause a loop would be barred from use. The evaluation of the modified list of rules (list of rules with the omitted sub-expression or sub-expressions) depends on there being training data on which to judge the accuracy of the list of rules.

In some embodiments, a dependency loop in the partial order graph among a set of classes can be broken by creating two separate classifiers for one or more of the classes: one copy avoiding inputs from other classifiers in the set that would create a loop. For example, suppose that the following 3-way loop is present: A→B→C→A (A serves as input to B, which serves as input to C, which serves as input to A). Rather than just eliminating A from the input to C, the feature selector 102 can split C into two classifiers: C and C', where C' does not depend on the output of B. Note that C' is a separately trained classifier that takes different input features than classifier C (in the above example, C' does not use any input features that depend on the output of B). Both classifiers C and C' are classifiers that are useable to decide whether cases are instances of class C. Then C' can be included among the inputs to A without creating a loop. In short: C'→A→B→C. The output of C' would only be used for input to A; the final classification output for class C would come from classifier C, not classifier C'. Likewise, C' may benefit from input from B, but this would create a loop; instead another classifier B' can be created for class B, which takes no inputs that would create a loop. It is allowed to take inputs from other classes, e.g., class D: D→B'→C'→A→B→C, and D B as well.

To break a loop, a single node to split may be selected randomly along the loop. Other more sophisticated techniques can also be used.

In the greedy approach above, to add an arc X→Y that would otherwise create a loop, the feature selector 102 can create an X' classifier, attach the arc X'→Y and eliminate from X' all inputs that support the loop.

Instructions of software described above (including the feature selector 102, partial order generator 106, and training module 108 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
    constructing, by a computer, a partial order among a set of classifiers, wherein the partial order indicates which classifiers can be input as features for other classifiers;
    based on the partial order, selecting, by the computer, as a feature for a second one of the classifiers, a function based on an output of a first one of the classifiers; and
    training the second classifier using the function based on the output of the first classifier.

2. The method of claim 1, wherein selecting as a feature the function based on the output of the first classifier comprises selecting one of: (1) the output of the first classifier and (2) an expression involving the output of at least the first classifier.

3. The method of claim 1, wherein constructing the partial order comprises constructing a partial order graph having a plurality of nodes representing classes corresponding to the set of classifiers.

4. The method of claim 3, further comprising:
    building a data structure containing measures indicating a desirability of using a function based on an output of one classifier as a feature for another classifier,
    wherein constructing the partial order graph comprises adding arcs to the partial order graph based on the measures contained in the data structure.

5. The method of claim 1, further comprising:
    building a desirability matrix having a plurality of entries defined by a first dimension and a second dimension of the desirability matrix, wherein the first dimension of the desirability matrix indicates classes for which classifiers are to be used in computation of input features, and the second dimension of the desirability matrix indicates classes associated with classifiers whose outputs are to be used in computing input features,
    wherein constructing the partial order is based on the desirability matrix.

6. The method of claim 5, wherein the second dimension of the desirability matrix represents either rows or columns of the desirability matrix, and wherein each row or column in the second dimension represents one of: (1) a corresponding class; (2) a corresponding subset of classes; and (3) an expression involving values produced by classifiers for one or more classes.

7. The method of claim 1, further comprising:
    applying the second classifier to a case by using as a feature a value obtained by applying the first classifier to the case.

8. The method of claim 1, wherein constructing the partial order comprises;
    computing a measure associated with the second classifier with respect to a set containing a first class associated with the first classifier, the computing comprising using a current classifier for the first class to obtain a feature value for a training case for a second class associated with the second classifier.

9. The method of claim 8, wherein obtaining the feature value comprises obtaining one of a decision reached by the current classifier, a score computed by the current classifier, a confidence measure for a decision reached by the current classifier, and a probability measure reached by the current classifier.

10. The method of claim 8, wherein computing the measure is based on a difference between a first metric and a second metric, where
    the first metric is computed for a first candidate classifier not based on the feature value; and
    the second metric is computed for a second candidate classifier based on the feature value.

11. The method of claim 8, wherein computing the measure comprises computing one of: an information gain, a hi-normal separation value, chi-squared value, accuracy measure, an error rate, an expected misclassification cost, a true positive rate, a false negative rate, a true negative rate, a false positive rate, an area under an ROC (receiver operating characteristic) curve, an f-measure, a mean absolute rate, a mean squared error, a mean relative error, a correlation value, a precision value, and a recall value.

12. The method of claim 8, wherein constructing the partial order comprises:
    comparing the measure with other measures relating sets of classes to classes; and
    choosing, based on the comparing, that the second class should dominate the first class in the partial order.

13. The method of claim 1, wherein constructing the partial order comprises:
    constructing a cyclic graph representing plural classes corresponding to the set of classifiers;
    computing measures for plural combinations of using one classifier as a feature for another classifier; and
    removing, based on the measures, at least one edge in the cyclic graph to break a cycle.

14. The method of claim 1, wherein constructing the partial order uses one of an greedy technique, a round-robin technique, an arc-deletion-based technique, and an evolutionary technique.

15. The method of claim 1, associating one of weights and cost matrices with classes corresponding to the set of classifiers, wherein constructing the partial order is based on the one of the weights and cost matrices.

16. A method for use with a classification task, comprising:

computing, by a computer, measures for different combinations of a set of classifiers, wherein each combination indicates that a function based on output of at least one classifier in the set is allowed to be used as a feature for another classifier in the set;

according to the computed measures, determining, by the computer, elations among the classifiers; and selecting, by the computer, based on the determined relations, functions based on outputs of classifiers to use as features for other classifiers.

17. The method of claim 16, wherein determining the relations among the classifiers comprises determining a partial order of the classifiers, and wherein the determined partial order is selected based on a evolutionary technique that specifies plural candidates representing corresponding partial orders, the plural candidates associated with corresponding fitness measures, wherein the selected partial order is selected from among the candidates based on the fitness measures.

18. A computer-readable storage medium containing instructions that when executed by a computer cause the computer to:

construct a partial order among a set of classifiers, wherein the partial order indicates which classifiers can be used as features for other classifiers;

based on the partial order, select as a feature for a second one of the classifiers, function based on an output of a first one of the classifiers; and train the second classifier using the function based on the output of the first classifier.

19. The computer-readable storage medium of claim 18, wherein the partial order is represented as a partial order graph including nodes representing corresponding classes, wherein the instructions when executed cause the computer to further:

split at least one of the nodes corresponding to a particular class into two nodes to remove a cycle from the partial order graph, wherein the two nodes represent two classifiers associated with the particular class.

20. The computer-readable storage medium of claim 18, wherein the instructions when executed cause the computer to further:

provide rules that involve outputs of at least some of the classifiers, wherein constructing the partial order is based in part on the rules.

21. The method of claim 16, further comprising training, by the computer, the other classifiers using the functions based on the outputs of the classifiers.

* * * * *

UNITED STATES PATENT AND TRADEMARK OFFICE
CERTIFICATE OF CORRECTION

PATENT NO.       : 7,756,799 B2                                  Page 1 of 1
APPLICATION NO.  : 11/588694
DATED            : July 13, 2010
INVENTOR(S)      : Evan R. Kirshenbaum et al.

It is certified that error appears in the above-identified patent and that said Letters Patent is hereby corrected as shown below:

In column 16, line 3, in Claim 5, delete "he" and insert -- be --, therefor,

In column 16, lines 40-41, in Claim 11, delete "hi-normal" and insert -- bi-normal --, therefor.

In column 17, line 10, in Claim 16, delete "elations" and insert -- relations --, therefor.

In column 18, line 2, in Claim 18, before "function" insert -- a --.

Signed and Sealed this

Ninth Day of November, 2010

David J. Kappos
*Director of the United States Patent and Trademark Office*